(No Model.)
F. PRINZ.
PROCESS FOR THE MANUFACTURE OF FLOUR.
No. 267,016. Patented Nov. 7, 1882.
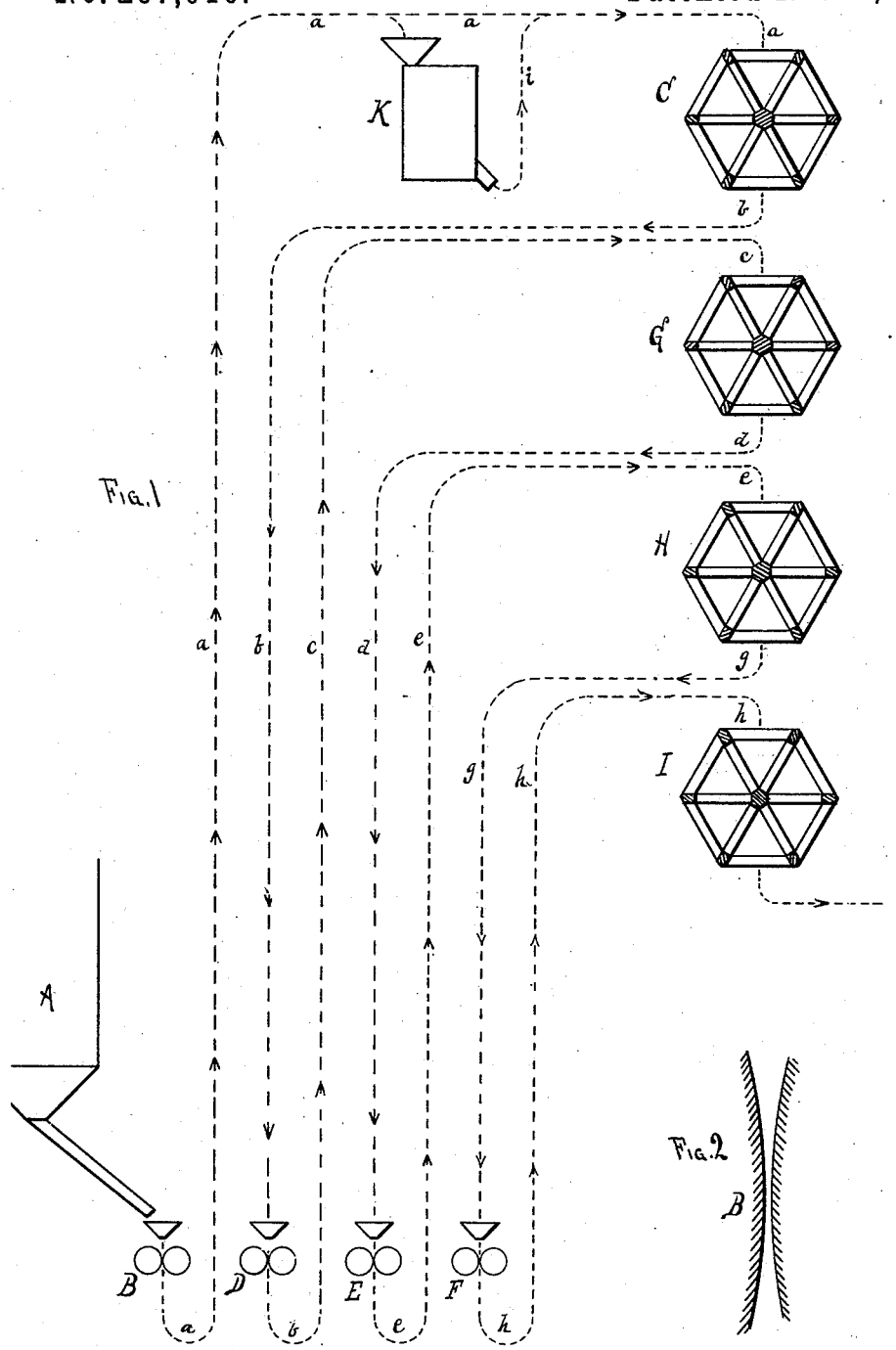

UNITED STATES PATENT OFFICE.

FAUSTIN PRINZ, OF ST. PAUL, MINNESOTA.

PROCESS FOR THE MANUFACTURE OF FLOUR.

SPECIFICATION forming part of Letters Patent No. 267,016, dated November 7, 1882, Application filed December 16, 1881. (No model.)

*To all whom it may concern:*

Be it known that I, FAUSTIN PRINZ, a subject of the Emperor of Germany, and a resident of St. Paul, in the county of Ramsey and State of Minnesota, have invented a certain new and useful Process for the Manufacture of Flour, set forth in the annexed specification.

This invention relates to the method of manufacturing flour known as the "gradual-reduction process;" and it consists in the process comprising the several steps hereinafter particularly described, and then sought to be specifically defined by the claims.

For the purpose of illustrating this process I have shown in Figure 1 in the drawings an outline representation of the rolls and bolts as used in a gradual-reduction mill where four (4) reductions are made, and in Fig. 2 an outline section of a portion of a pair of rolls having the smooth surface.

In the gradual-reduction process the wheat passes from the bin A to the first set of rolls, B, through which it passes and is merely cracked or split to permit the germ and some loose middlings and bran to escape, and the product carried, as indicated by dotted lines *a*, to the first scalping-reel, C, to separate the germ, coarser middlings, and bran, and the coarser particles, consisting of the loose germ, middlings, and bran, carried to an aspirator, while the "tailings" (by which I mean the clean cracked wheat and coarse middlings, separated from the dust, fine middlings, and bran) are returned to the second set of rolls, D, as indicated by dotted lines *b*, and so on through the remaining rolls, E F, and bolts G H I, as indicated by dotted lines *c d e*, all the said rolls, after the first set, being fluted or furrowed, as heretofore.

As before stated, the first reduction is merely intended to "crack" or split the berries of the wheat, and has heretofore been accomplished by furrowed rolls; but these have a tendency to cut the wheat up into too small particles, and also to cut the bran; and to avoid these objections I use smooth-surfaced rolls at the first reduction, set far enough apart to crack or split the berries and loosen the interior structure, but without cutting the bran or crushing the germ. This action also prepares the wheat in better shape for the further reductions, so that a less number of rolls will be required to produce the same grades of flour than in the old method. The smooth rolls also require less power to drive them than the "scratched" or fluted rolls, and as the first reduction always requires more power than the after reductions I can thus do the same work with less power or more work with the same power.

Any number of sets of rolls may be used; but I have found by experiment that with my process four (4) sets of rolls will do the work of five (5) in the furrowed form. After the cracked wheat leaves the rolls B, and before it is passed through the scalping-reel C' it may be passed through a brushing-machine, K, to more thoroughly separate the loosened particles, if desired.

What I claim as new is—

1. The process herein described for reducing wheat to flour, consisting in first cracking the wheat by passing it between smooth-surfaced rolls set far enough apart to merely crack the wheat without crushing the germ; secondly, in separating the germ, coarser middlings, and bran by passing the product of the first step through suitable bolts or screens; and, thirdly, in cracking or crushing the cleaned wheat and coarse middlings of the second step by passing them between corrugated rolls, as set forth.

2. The process herein described for reducing wheat to flour, consisting, first, in cracking the wheat by passing it between smooth-surfaced rolls set far enough apart to merely crack the wheat without crushing the germ or cutting the bran; next, in separating the germ, coarse middlings, and bran by passing the product of the first step through a brushing or rubbing machine, and afterward through suitable bolts or screens, and then cracking the cleaned wheat and coarse middlings of the second step by passing them between corrugated rolls, as set forth.

In testimony whereof I have hereunto set my hand in the presence of two subscribing witnesses.

FAUSTIN PRINZ.

Witnesses:
C. N. WOODWARD,
EDWARD ROTERT.